United States Patent [19]
Dissett et al.

[11] Patent Number: 5,582,557
[45] Date of Patent: Dec. 10, 1996

[54] HYDRAULICALLY-OPERABLE LOCKING DIFFERENTIAL WITH IN-LINE PISTON MEANS

[75] Inventors: Walter L. Dissett, Farmington Hills; Paul J. Valente, Berkley, both of Mich.

[73] Assignee: Titan Wheel International, Inc., Quincy, Ill.

[21] Appl. No.: 482,846

[22] Filed: Jun. 7, 1995

[51] Int. Cl.$^6$ ................................ F16H 48/30
[52] U.S. Cl. ............................................. 475/231
[58] Field of Search ............................................. 475/231

[56] References Cited

U.S. PATENT DOCUMENTS

| | | | |
|---|---|---|---|
| 3,974,717 | 8/1976 | Breed et al. ........................ | 74/713 |
| 4,790,404 | 12/1988 | Naito ........................ | 180/197 |
| 5,133,696 | 7/1992 | Kobayashi ........................ | 475/231 |
| 5,152,362 | 10/1992 | Naito ........................ | 180/248 |
| 5,161,636 | 11/1992 | Haupt ........................ | 180/248 |
| 5,172,787 | 12/1992 | Kobayashi ........................ | 475/231 |
| 5,295,921 | 3/1994 | Ippolito et al. ........................ | 475/231 |
| 5,445,574 | 8/1995 | Sekigucji et al. ........................ | 475/231 |

*Primary Examiner*—Dirk Wright
*Attorney, Agent, or Firm*—Laubscher & Laubscher

[57] ABSTRACT

A hydraulically-operable locking differential includes a friction-pack arrangement for locking an output shaft and associated side gear with the differential housing, use being made of a piston-cylinder motor the axis of which is colinear with the output shaft. The advantage is afforded that the locking operation may be effected while the drive and output shafts are rotating without stopping the vehicle.

8 Claims, 5 Drawing Sheets

5,582,557

HYDRAULICALLY-OPERABLE LOCKING DIFFERENTIAL WITH IN-LINE PISTON MEANS

STATEMENT OF THE INVENTION

An improved locking differential is provided including hydraulically-operable annular friction pack means arranged concentrically about a given output shaft for selectively connecting the output shaft and its associate side gear to the differential housing that is rotatably driven by the drive shaft, use being made of a hydraulic piston and cylinder motor the axis of which is colinear with that of the given output shaft.

BRIEF DESCRIPTION OF THE PRIOR ART

Limited slip differentials including hydraulically-operable friction pack means are known in the art, as evidenced by the patents to Breed et al U.S. Pat. No. 3,974,717, Naito U.S. Pat. Nos. 4,790,404, and 5,152,362 and Haupt et al U.S. Pat. No. 5,161,636, among others.

It is also known to provide locking differentials in which hydraulically-operable clutch dog means are utilized to effect locking of an output shaft to the differential currently housing, as indicated by the locking differential currently produced by Fiat Motor Co. Since this type of locking differential requires that the various drive and driven shafts of the differential be stationary during the shifting of the clutch dog means, it is desirable to provide an improved hydraulically-operable locking arrangement for converting the known differentials to differentials that can be operated while the vehicle is in operation, and which require fewer parts and are thus less costly.

SUMMARY OF THE INVENTION

Accordingly, a primary object of the present invention is to provide an improved hydraulically-operable locking differential in which an annular friction pack assembly is mounted concentrically about an output shaft for locking the output shaft and the side gear splined thereto to the differential housing by means of a piston and cylinder motor the axis of operation of which is colinear with the axis of rotation of the output shaft and the differential housing.

According to a more specific object of the invention, the friction pack assembly is arranged outside of the differential housing and includes friction disks that are splined for axial displacement relative to the housing. Reaction disks arranged alternately between the friction disks are splined to the inner surface of a cup-shaped piston which in turn is splined to the output shaft, so that when the friction pack assembly is axially compressed, the output shaft and its associated side gear are locked to the differential housing.

A further object of the invention is to provide a locking differential of the type described above wherein the cylinder is also cup-shaped and is removably connected with the differential casing for substitution for the known mechanical clutch dog arrangement. The cup-shaped piston includes an annular end wall projecting portion that is splined to the output shaft and that extends axially within a corresponding opening contained in the cylinder end wall. Seal means are provided for sealing the sliding connection between the piston side wall and the cylinder side wall, thereby to seal the working chamber of the in-line hydraulic motor means.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figure 1:
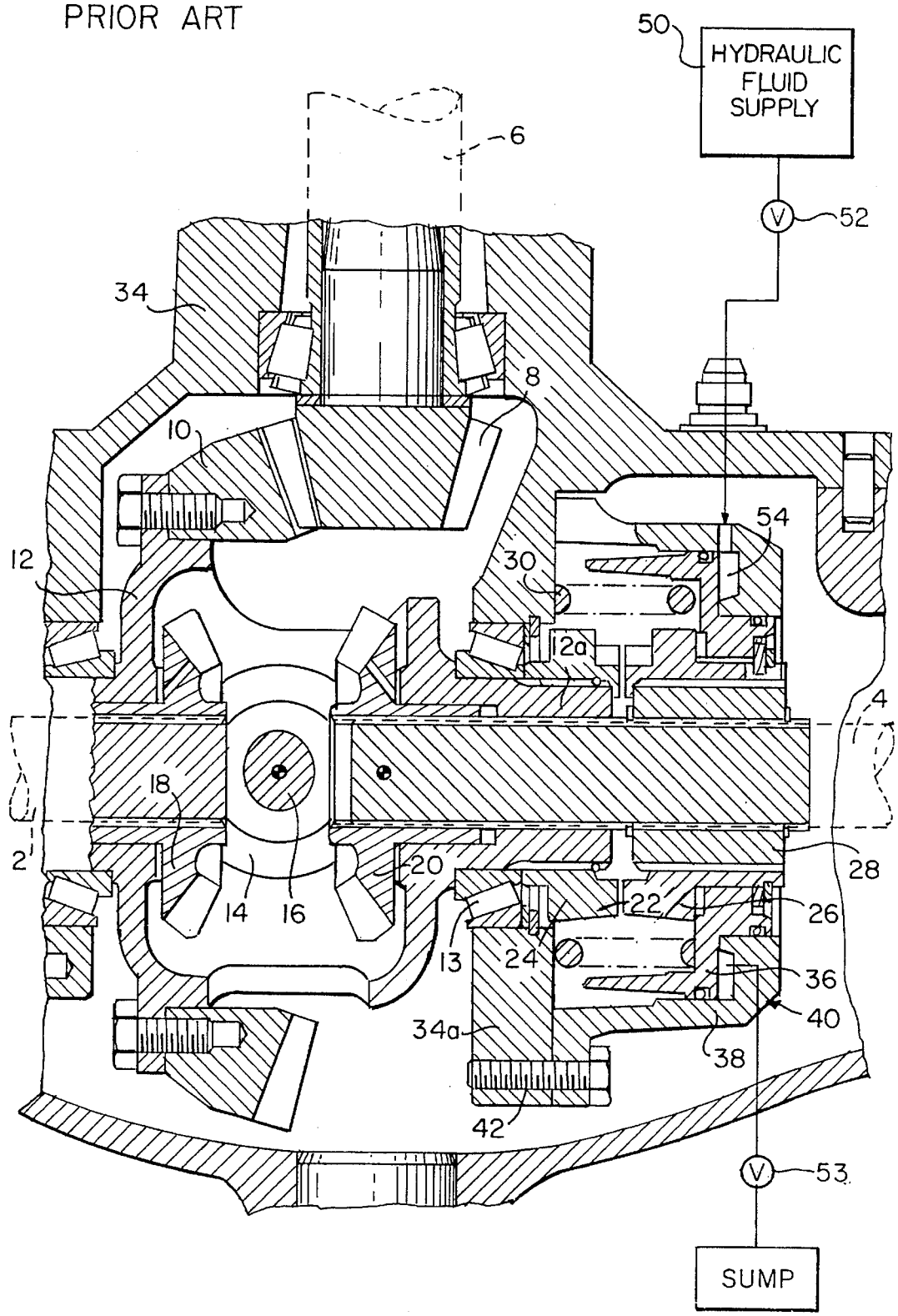
FIG. 1 is a sectional view of a locking differential of the prior art.

Referring first more particularly to FIG. 1, the illustrated locking differential is known in the prior art and is typical of the differential use by Fiat Motor Co. As is conventional, the output shafts 2 and 4 are driven from drive shaft 6 via drive pinion 8, ring gear 10 which is bolted to the rotatably mounted housing 12, intermediate bevel pinion 14 that is rotatably connected with housing 12 by spider shaft 16, and a pair of side gears 18 and 20 that are non-rotatably splined to the output shafts 2 and 4, respectively. In accordance with a characterizing feature of this differential, clutch dog means 22 are provided for locking the output shaft 4 to the differential housing 12. To this end, first clutch dog member 24 is splined for non-rotatable connection with the axially projecting housing end portion 12a, and a cooperating second clutch dog member 26 is provided that is splined for axial sliding displacement relative to annular sleeve member 28 which in turn is splined to the output shaft 4. The clutch dog members 24 and 26 are normally biased apart toward the illustrated disengaged position by helical compression spring means 30 that reacts between wall portion 34a of the differential casing 34 and the end wall of cup-shaped piston 36 that reciprocates within a similar cup-shaped cylinder 38 of hydraulic motor means 40. The cylinder 38 is removably bolted to casing wall portion 38 by bolt means 42. Output shafts 2 and 4, and the side gears 18 and 20 splined thereto, normally rotate freely relative to housing 12.

In this prior art differential embodiment, in order to connect output shaft 4 and side gear 20 to the differential housing 12, hydraulic fluid from source 50 is supplied via valve 52 to the working chamber 54 of hydraulic motor 40, which working chamber is defined between the end walls of the piston and cylinder. Thus, when the differential gearing arrangement is at rest and hydraulic fluid is supplied to working chamber 54 from source 50 via control valve 52, piston 36 is displaced to the left against the biasing force of spring 30, thereby to shift movable clutch dog member 26 into engagement with the clutch dog member 24 that is splined to the differential housing 12. Housing 12 is now connected with side gear 20 via the cooperating teeth of clutch dog members 24 and 26, splined sleeve 28, and splined output shaft 4 which is freely rotatable within the end opening contained in housing 12. Since the side gears and intermediate gears are locked to the housing 12, the output shafts 2 and 4 are driven at the same speed from drive shaft 6. Upon closing valve 52 and opening valve 53 to vent working chamber 54, spring 30 expands to shift clutch dog 36 to the right toward the illustrated disengaged condition.

Figure 2:
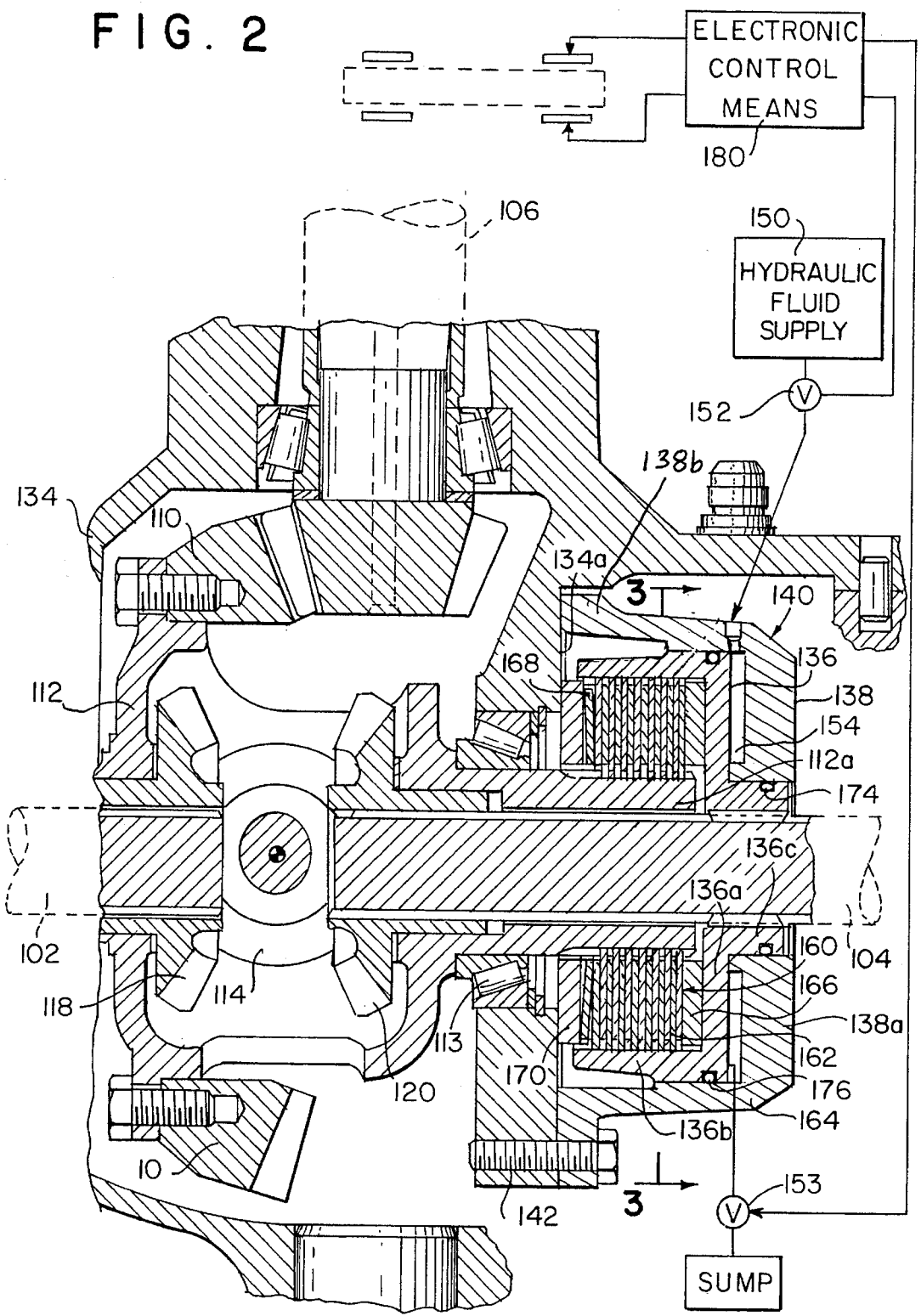
FIG. 2 is a sectional view of a first embodiment of the improved locking differential of the present invention.
Figure 3:
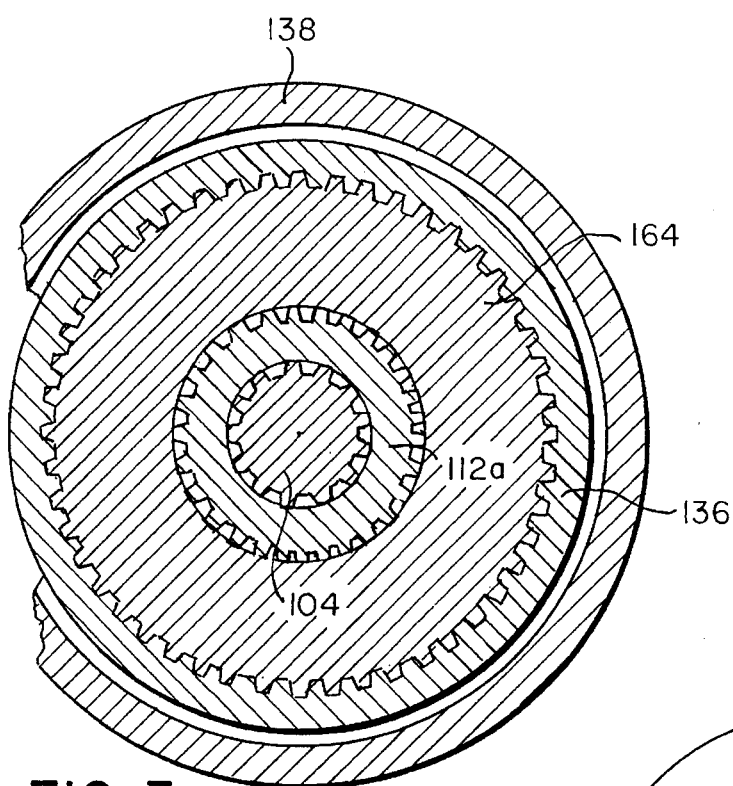
FIG. 3 is a sectional view taken along line 3—3 of FIG. 2.
Figure 4:
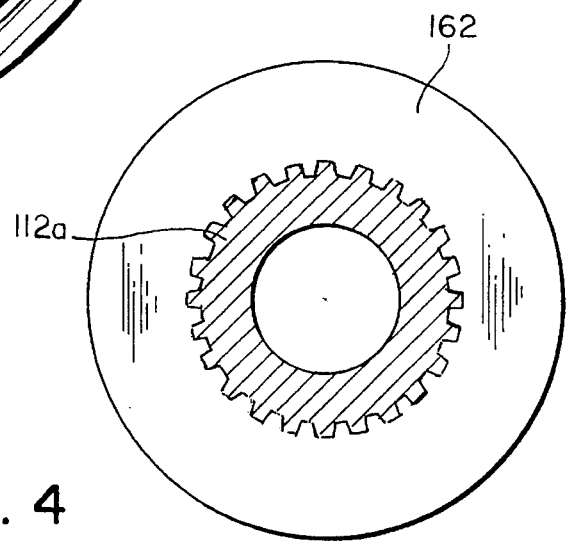
FIG. 4 is an end view of one of the friction disks of FIG. 2.

Referring now to FIGS. 2–4, the improved differential of the present invention includes an annular friction pack assembly 160 arranged concentrically about the end portion 112a of housing 112 that extends beyond the bearing support means 113.

The friction pack assembly includes a stack of alternately arranged annular friction disks 162 and reaction disks 164, the friction disks 162 being splined at their inner circumference in non-rotatable axially-slidable relation with the housing end portion 112a, and the reaction disks 164 being in non-rotatable axially-slidable splined relation relative to the inner surface of the annular wall portion 136b of piston 136.

First annular spacer washer 166 is arranged concentrically about the output shaft 104 intermediate the friction pack means 160 and the piston bottom wall 136a. Arranged between the other end of the friction pack means 160 and the casing wall surface 134a is an annular disk spring 168 and a second annular washer 170.

The cup-shaped piston 136 is arranged for axial sliding displacement within a corresponding cup-shaped cylinder 138 having an end wall portion 138a extending normal to the output shaft 104, and an annular side wall portion 138b the free extremity of which is maintained in tight engagement with the casing wall surface 134a, as effected by the tight pressure produced by the bolt fastening means 142.

The piston end wall 136a contains a central opening and an annular projecting portion 136c that is splined for axial sliding connection relative to the output shaft 104, the sliding connection between the outer surface of the annular projecting portion 136c and the corresponding wall of the central opening contained in the cylinder 138 being sealed by a first quad-ring 174. A second quad-ring 176 provides a seal between the outer surface and the piston 136 and the inner wall surface of the cylinder 138, thereby defining between the end walls 136 and 138 a hydraulic working chamber 154.

OPERATION

In operation, assume that the vehicle is in operation, that the output shafts 102 and 104 and the drive shaft 106 are rotating, and it is desired to lock the differential by connecting the output shaft 104 and side gear 102 to the differential housing 112. Pressure fluid is supplied to working chamber 154 from source 150 via control valve 152, and piston 136 is shifted to the left toward casing wall surface 134a against the biasing force of disk spring 168, thereby to press the friction plates 162 and reaction plates 164 axially together, whereby the piston 136, output shaft 104, and side gear 120 are locked to the differential housing 112. The housing 112 is rotatably driven from drive shaft 106 via ring gear 110, whereupon the output shafts 102 and 104 are then driven at the same rotational velocity.

When it is desired to remove the locking condition, the supply of fluid to working chamber 154 via valve 152 is interrupted, and the working chamber is vented to sump via second control valve 153. Disk spring 168 expands to bias the friction pack 160 and washer 166 to the right, and the pressure on the alternately arranged pressure plates and reaction plates is relieved, whereupon output shaft 104, piston 136, reaction plates 164, and side gear 120 are free for rotation relative to the housing 112. The unlocked differential then operates in its normal manner.

The present invention offers the advantage that it permits shifting "on the fly" while the vehicle is moving, and furthermore requires fewer complex components. It is also easy to automatically control the activation of the system by conventional electronic speed sensor means 180 that control the operation of the control valves 152 and 154 as a function of wheel or shaft rotational velocity. The use of the friction pack means permits the adjustment of the friction pressure, thereby to determine the torque bias of a limited slip differential.

Figure 5:
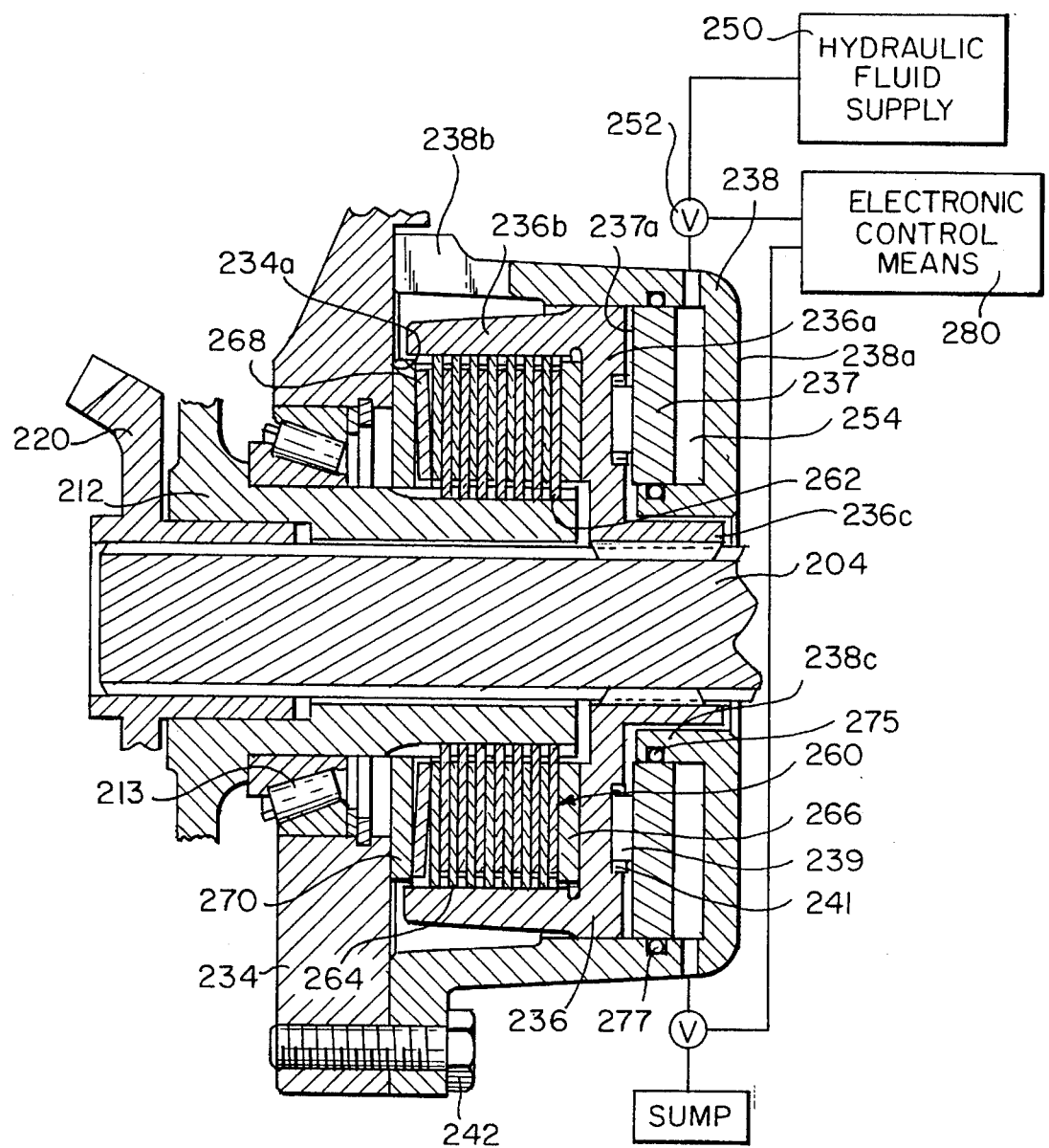
FIG. 5 is a sectional view of the preferred embodiment of the invention.
Figure 6:
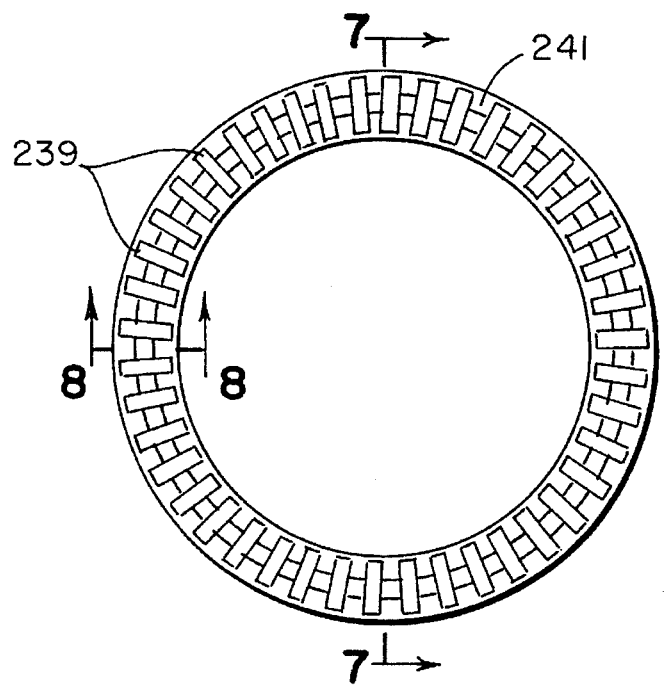
FIG. 6 is an end view of the annular roller bearing means of FIG. 5.
Figure 7:
FIGS. 7 and 8 are sectional views taken along lines 7—7 and 8—8 of FIG. 6, respectively.
Figure 8:
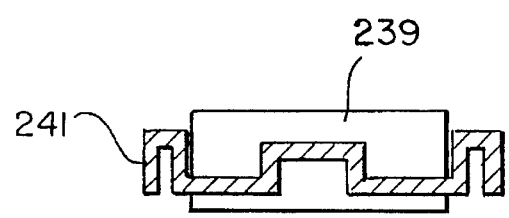

Referring now to the preferred embodiment of FIG. 5, in order to axially compress the reaction disks 264 that rotate with the output shaft 204, and the friction disks 262 that are splined to the stationary housing portion 212, thereby to lock the driver shaft 204 to the housing 212, an auxiliary annular piston 237 of generally planar configuration is mounted for sliding movement within an annular groove contained in the end wall of the cylinder 239 in response to the supply of pressure fluid from source 250 to working chamber 254 via valve 252. The planar left-hand face 237a of piston 237 is in constant engagement with a plurality of cylindrical roller bearings 239 that are radially mounted in annular bearing cage support 241. At one end, the friction pack 260 is engaged by annular washer 266, and at its other end the friction pack engages disk spring 268 which in turn is in engagement with annular washer 270. The working chamber 254 is sealed by the annular resilient quad-rings 275 and 277 that are mounted in annular grooves contained in the cylinder walls for sliding engagement with the inner and outer circumferential walls of auxiliary piston member 237, respectively. Alternatively, the quad-ring seals could be arranged in corresponding grooves contained in the outer and inner circumferential surfaces of the piston.

In this embodiment, a tighter seal of the chamber 254 is maintained since the piston 237 is not rotatably driven relative to cylinder 238, as in the embodiment of FIG. 2. Otherwise, the operation of the two differentials is substantially the same.

While in accordance with the provisions of the Patent Statutes the preferred forms and embodiments of the invention have been illustrated and described, it will be apparent to those skilled in the art that various modifications may be made without deviating from the inventive concepts set forth above.

What is claimed is:

1. A locking differential apparatus for driving a pair of aligned axially spaced output shafts from a rotatably driven drive shaft, comprising:

(a) a hollow differential casing (134; 234) containing a chamber and including an input shaft wall opening for receiving said input shaft, and a pair of opposed casing walls containing output shaft wall openings;

(b) a hollow differential housing (112; 212) rotatably mounted within said casing chamber, said housing including a pair of axially aligned end portions journalled in said casing output shaft openings, respectively, thereby to define the axis of rotation of said housing, said housing end portions containing aligned through bores for receiving said output shafts, respectively, at least one of said housing end portions (112a, 212a) extending axially outwardly through of said casing wall opening;

(c) differential gearing means connected with said housing for driving the output shafts from the drive shaft, including:

(1) ring gear means (110) driven by the drive shaft for rotating said housing about said rotational axis;

(2) a pair of side gears (118, 120) rotatably mounted in said housing through bores for splined non-rotatable connection with the output shafts, respectively; and (3) intermediate pinion gears (114) rotatably connected with said housing and in enmeshing engagement with said side gears; and (d) normally-deactivated locking means operable to lock one of said side gears (120, 220) and the associated output shall (104, 204) with said housing, including:

(1) annular friction pack means (160; 260) arranged concentrically about said one housing end portion, said friction pack means including a stack of alternately arranged relatively axially displaceable friction disks (162; 262) and reaction disks (164; 266) adapted for connection with said housing and with the associated output shaft, respectively; and (2) hydraulic motor means for axially compressing said friction pack means, including;

(a) a pair of nested outer and inner cup-shaped members (138, 136; 238, 236) having concentrically arranged annular side walls (136b; 236b) extending concentrically about said friction pack means, and end walls (136a; 236a) at adjacent first ends of said side walls remote from said housing, respectively, said end walls each containing aligned central openings for receiving said associated output shaft;

(b) means (142; 242) connecting the other end of said outer cup-shaped member with the adjacent casing wall, said inner cup-shaped member being axially displaceable relative to said outer cup-shaped member, said friction discs being axially splined to the outer circumference of said one housing end portion, said reaction disks being axially splined to the inner circumference of said inner cup-shaped member side wall, and said inner cup shaped member end wall being adapted for axially splined connection with the associated output shaft; and (c) means defining a hydraulic motor working chamber (154; 254) between said inner and outer cup-shaped member end walls, whereby upon the introduction of pressure fluid into said working chamber, said inner cup-shaped member is axially displaced toward said casing to compress said friction pack means.

2. Apparatus as defined in claim 1, and further including annular disk spring means (168; 268) compressed between said friction pack means and said adjacent casing wall to bias said friction and reaction disks together, thereby to afford limited slip operation of the differential.

3. Apparatus as defined in claim 2, and further including a first annular reaction washer (166; 266) arranged between said friction pack means and said inner cup-shaped member end wall, and a second annular reaction washer (170; 270) arranged between said disk spring and said adjacent casing wall.

4. Apparatus as defined in claim 1, wherein the surface of said outer cup-shaped member end wall adjacent said inner cup-shaped member end wall contains an annular groove defining said working chamber; and further wherein said side walls of said inner and outer cup-shaped members are in sliding engagement.

5. Apparatus as defined in claim 4, wherein said inner cup-shaped member includes on its end wall an integral annular projecting portion (136c; 236c) arranged concentrically about said inner cup-shaped member end wall opening, said projecting potion extending in sliding engagement within said outer cup-shaped member end wall opening.

6. Apparatus as defined in claim 5, and further including first seal means (176) affording a seal between said inner and outer cup-shaped member side walls, and second seal means (174) affording a seal between said inner cup-shaped member annular projecting portion and said outer cup-shaped member end wall opening.

7. Apparatus as defined in claim 5, and further including an auxiliary annular piston (237) mounted for sliding movement in said end wall annular groove; and further including annular bearing means (239, 241) arranged between said auxiliary piston and said inner cup-shaped member end wall, whereby upon the application of pressure to said working chamber, said auxiliary piston activates said inner cup-shape member to axially compress said friction pack means.

8. Apparatus as defined in claim 7, and further including seal means (275, 277) for sealing the inner and outer peripheral walls of said annular auxiliary piston relative to the walls of said annular groove.

* * * * *